United States Patent
Suhir (10) Patent No.: US 6,606,434 B1
(45) Date of Patent: Aug. 12, 2003

(54) OPTICAL FIBER INTERCONNECT HAVING OFFSET ENDS WITH REDUCED TENSILE STRESS AND FABRICATION METHOD

(75) Inventor: Ephraim Suhir, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 125 days.

(21) Appl. No.: 09/644,166

(22) Filed: Aug. 23, 2000

(51) Int. Cl.[7] ............................. G02B 6/26; G02B 6/36
(52) U.S. Cl. ......................... 385/51; 385/76; 385/137
(58) Field of Search .................... 385/12–15, 48–51, 385/70, 72, 76, 78, 80, 92, 94, 99, 123, 136, 137, 139, 147

(56) References Cited

U.S. PATENT DOCUMENTS

| | | | | |
|---|---|---|---|---|
| 4,184,860 A | * | 1/1980 | Schneider et al. | 385/123 X |
| 4,803,361 A | * | 2/1989 | Aiki et al. | 385/49 X |
| 4,892,069 A | * | 1/1990 | Rösch et al. | 123/193.3 |
| 5,971,629 A | * | 10/1999 | Bloom | 385/94 |
| 6,000,858 A | * | 12/1999 | Bloom | 385/94 |
| 6,180,241 B1 | * | 1/2001 | Suhir | 428/418 |
| 6,244,756 B1 | * | 6/2001 | Bloom | 385/94 |

OTHER PUBLICATIONS

Suhir, E. "Predicted Curvature and Stresses in an Optical Fiber Interconnect Subjected to Bending", IEEE/OSA Journal of Lightwave Technology, vol. 14, No. 2, 1996(Feb.), pp. 144–147.

Suhir, E "Structural Analysis in Microelectronic and Fiber Optic Systems", Van–Nostrand Reinhold, New York, 1991, Table of Contents, Preface, Bibliography.

Suhir, E. "Thermally Induced Stresses in an Optical Glass Fiber Soldered into a Ferrule", Journal of Lightwave Technology, vol. 12, No. 10, Oct. 1994, pp. 1766–1770.

Suhir, E "Pull Testing of a Glass Fiber Soldered into a Ferrule: How Long should the Test Specimen Be?", Applied Optics, vol. 33, No. 19, 1994(Jul.), pp. 4109–4112.

Devadoss, E. "Polymers for Optical Fiber Communication Systems", Journal of Scientific and Industrial Research, vol. 51, No. 4, 1992(Apr.), pp. 322–328.

Gebizioghu, O. S., Plitz, I. M. "Self–Stripping of Optical Fiber Coatings in Hydrocarbon Liquids and Cable Filling Compounds", Optical Engineering, vol. 30, No. 6, 1991(Jun.), pp. 749–762.

Suhir, E. "Effect of the Initial Curvature on the Low Temperature Microbending in Optical Fibers", IEEE/OSA Journal of Lightwave Technology, vol. 6, No. 8, 1988(Aug.), pp. 1321–1327.

(List continued on next page.)

*Primary Examiner*—John D. Lee (57) ABSTRACT

A method of fabricating a structure comprising an optical fiber interconnect rigidly clamped within an enclosure wherein ends of the interconnect are offset. The method comprises selecting an enclosure material such that its coefficient of thermal expansion leads, during cooling, to a compressive force that minimizes tensile stress in the interconnect. An optical fiber interconnect structure and a semiconductor device fabricated according to the method are also disclosed.

17 Claims, 4 Drawing Sheets

Optical interconnect subjected to the lateral ends offset and axial loading.

OTHER PUBLICATIONS

Suhir, E. "Stresses in Dual–Coated Optical Fibers", ASME Journal of Applied Mechanics, vol. 55, No. 10, 1988(Dec.), pp. 822–830.

Suhir, E. "Stresses in a Coated Fiber Stretched on a Capstan", Applied Optics, vol. 29, No. 18, 1990(Jun.), pp. 2664–2666.

Suhir, E. "Stresses in a Partially Coated Optical Glass Fiber Subjected to the Ends Off–Set",Journal of Lightwave Technology, vol. 15, No. 11, Nov. 1997, pp. 2091–2094.

King, W. W. and Aloisio, C. J. "Thermomechanical Mechanism for Delamination of Polymer Coatings from Optical Fibers", ASME Journal of Electronic Packaging, vol. 119, No. 2, 1997(Jun.), pp. 133–137.

Suhir, E. "Approximate Evaluation of the Interfacial Shearing Stress in Cylindrical Double–Lap Shear Joints, with Application to Dual–Coated Optical Fibers", International Journal of Solids and Structures, vol. 31, No. 23, 1994, pp. 3261–3283.

Suhir, E. "Predicted Thermal Mismatch Stresses in a Cylindrical Bi–Material Assembly Adhesively Bonded at the Ends", ASME Journal of Applied Mechanics, vol. 64, No. 1, 1997(Mar.), pp. 15–22.

Shiue, S. T. "Design of Double–Coated Optical Fibers to Minimize Hydrostatic Pressure Induced Microbenging Losses", IEE Photonics Technology Letters, vol. 4, No. 7, Jul. 1992, pp. 746–748.

Shiue, S. T. "Axial strain–induced microbending losses in double–coated optical fibers", J. Appl. Phys. 73 (2), Jan. 15, 1993, pp. 526–529.

Shiue, S.T. and Lee, S. B. "Thermal Stresses in Double–Coated Optical Fibers at Low Temperature", Journal of Applied Physics, vol. 72, No. 1, 1992(Jul.), pp. 18–23.

Shiue, S. T. and Lee, W. H. "Thermal Stresses in Carbon Coated Optical Fibers at Low Temperature", Journal of Materials Research, vol. 12, No. 9, 1997(Sep.), pp. 2493–2498.

Cocchini, F. "Double–Coated Optical Fibers Undergoing Temperature Variations—The Influence of the Mechanical Behavior on the Added Transmission Losss", Polymer Engineeringand Scince, vol. 34, No. 5, 1994(Mar.), pp. 414–419.

Shiue, S.T., "Thermally induced microbending losses in double–coated optical fibers at low temperature", Materials Chemistry and Physics 38 (1994) 187–190.

Ostojic, P., "Stress enhanced environmental corrosion and lifetime prediction modelling in silica optical fibres", Journal of Materials Science 30 (1995) 3011–3023.

Suhir, E., "Analysis and Optimization of the Input/Output Fiber Configuration in a Laser Package Design", Journal of Electronic Packaging, vol. 117, 261–265, Dec. 1995.

Suhir, E., "Coated Optical Fiber Interconnect Subjected to the Ends Off–Set and Axial Loading", EEP vol. 25, 1998, Workshop on Mechanical Reliability of Polymeric Materials and Plastic Packages of IC Devices, ASME 1998, pp. 301–333.

Suhir, E., "Can the Curvature of an Optical Glass Fiber be Different from the Curvature of its Coating?",Int. J. Solids Structures, vol. 30, No. 17, pp. 2425–2435, 1993.

* cited by examiner

Fig. 1 Optical interconnect subjected to the lateral ends offset and axial loading.

Fig. 2 Auxiliary functions to calculate deflections, rotation angles and curvatures Fig. 3 Dimensionless deflection curves for an interconnect subjected to compression Fig. 4  Dimensionless curvatures of the interconnect subjected to compression

OPTICAL FIBER INTERCONNECT HAVING OFFSET ENDS WITH REDUCED TENSILE STRESS AND FABRICATION METHOD

FIELD OF THE INVENTION

The invention relates to optical fiber interconnects having offset ends.

BACKGROUND OF THE INVENTION

Optical fiber interconnects are often subjected to the ends being offset. Such an offset can be due to the inability of an employed technology to ensure a low enough misalignment of the interconnect ends, or can be an essential feature of a particular photonic package design. If the offset is substantial, it leads to a reactive tensile force in the fiber. This force occurs because the ends of the interconnect cannot move closer to compensate for the greater length of the deformed fiber. The reactive tensile force not only results in a tensile stress in the fiber, but also, more importantly, can lead to a significant increase in the bending stress. The adverse consequences of the tensile stress can be even greater, if the interconnect is subjected to the additional, "active", tension. Such a tension can be due, for instance, to the thermal expansion mismatch between the low expansion glass and the relatively high expansion material of the enclosure, when the structure is heated up for reflow soldering, during a laser welding operation, or during temperature cycling. Elevated tensile stresses and curvatures may have an adverse effect on interconnect mechanical strength and transmission losses. The situation is different, however, in the case of compression. Interconnect compression can be caused, for example, by the thermal contraction mismatch of the glass with the material of the enclosure, when the structure is cooled down from a manufacturing temperature to a lower room or testing temperature.

It is, therefore, desirable to minimize optical fiber interconnect bending to achieve lower tensile stresses and curvatures which may improve mechanical strength and minimize transmission losses.

SUMMARY OF THE INVENTION

A method is disclosed of fabricating a structure comprising an optical fiber interconnect adhesively soldered or epoxy bonded into a ferrule inside an enclosure. An illustrative embodiment of the method comprises selecting an enclosure material such that a compressive force caused by the thermal contraction mismatch of the glass fiber with the material of the enclosure during the cooling of the structure minimizes tensile stress in the interconnect. Cooling may be for example, from a manufacturing temperature to room temperature.

Further disclosed are an optical fiber interconnect structure and a semiconductor device fabricated according to the method.

DESCRIPTION OF THE DRAWINGS

The invention is best understood from the following detailed description when read with the accompanying drawing figures.

DETAILED DESCRIPTION OF THE INVENTION

A fiber interconnect is typically used at a temperature lower than that at which it is manufactured. For example, bonding or soldering of the interconnect to an enclosure may take place at temperatures greater than 120° C., whereas the interconnect may be used at room temperature, causing the structure to be subjected to a temperature change of about 100° C. Use of interconnects in colder environments causes exposure to even greater temperature changes. The invention, as it relates to an optical fiber interconnect with its ends offset, takes advantage of induced axial compression arising during structure cooling, to minimize maximum tensile stress which is due to bending of the interconnect. The compression is due to the thermal contraction mismatch of the glass and the enclosure materials. As used herein, minimizing a stress includes reducing it and eliminating it.

The invention includes a structure comprising a fiber interconnect rigidly clamped within an enclosure, the interconnect having ends offset, wherein the enclosure material is selected such that its coefficient of thermal expansion leads, during cooling, to a compressive force that minimizes the tensile stress in the interconnect. This favorable compression effect may be achieved through a proper selection of the enclosure material, i.e. through a selection of an adequate mismatch between the materials of the fiber and the enclosure. When a particular manufacturing technology is employed, the interconnect could be subjected to temperatures exceeding the manufacturing temperatures. As a consequence, the interconnect can experience elevated tensile stresses for a relatively short period of time, before the structure is cooled down to the "steady-state" service temperature. Accordingly, formulas for the prediction of the tensile stresses in a situation, when the structure is heated up to a high temperature are also provided herein.

The following analysis examines an optical fiber interconnect subjected to the ends offset and subsequent axial loading in tension or compression. Simple analytical stress models are developed for the evaluation of the bending stresses in the interconnect as a result of a not-very-small-ends offset. The term "not-very-small" is used herein to indicate that the fiber deflections, caused by such an off-set, are large enough, so that the reactive tension cannot be neglected, but are small enough, so that the linear theory of bending of beams can be used for the prediction of stresses and strains. An evaluation is presented of the maximum tensile stress in the fiber due to the reactive tension and the subsequent thermally induced external ("active") tension, as well as to thermal external ("active") compression. The analytical models are used to design an optical fiber interconnect, characterized by the minimum possible tensile stress.

Figure 1:
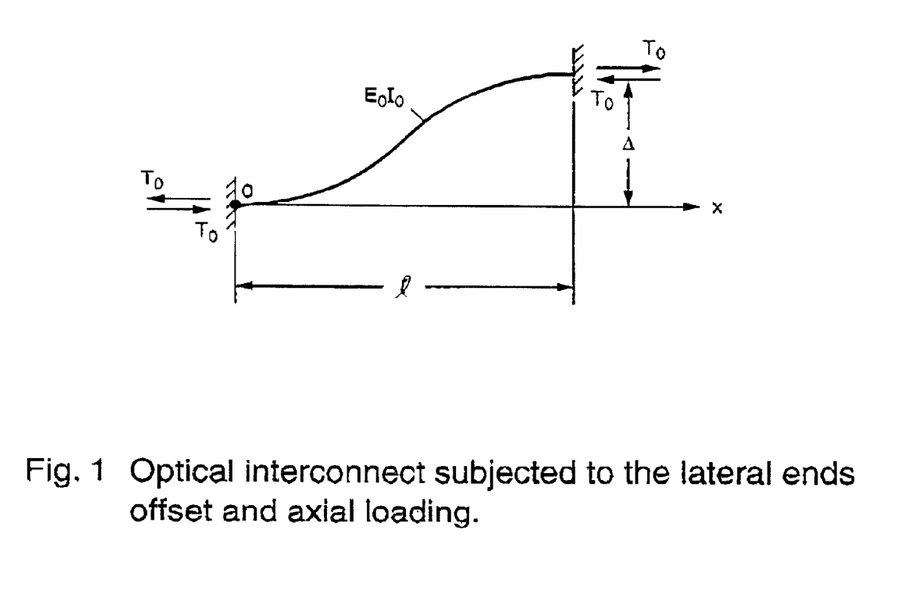
FIG. 1. depicts an optical fiber interconnect subjected to an offset of the lateral ends and to axial loading.

1. Optical Fiber Interconnect Subjected to the Ends Offset and Reactive Tension 1.1 Deflection Function Let an optical fiber interconnect be subjected to a not very small ends offset, $\Delta$, that results in reactive tensile forces, $T_0$, as depicted in FIG. 1. The deflection function (elastic curve), $w(x)$, of the fiber can be determined from the equation of bending $$E_0 I_0 w^{IV}(x) - T_0 w''(x) = 0 \qquad (1)$$

and the boundary conditions $$w(0)=0,\ w'(0)=0,\ w(l)=\Delta,\ w'(l)=0, \qquad (2)$$

where $E_0 I_0$ is the flexural rigidity of the fiber, $E_0$ is Young's modulus of the material, $I_0 = \pi/4 r_0^4$ is the moment of inertia of the fiber cross-section, $r_0$ is the radius of the fiber, and l is the interconnect span. The origin, 0, of the coordinate x is at the left support of the interconnect. The equation (1), considering the boundary conditions (2), has the following solution:

$$w(x) = \frac{\Delta}{2}\left[1 - \cosh kx - \frac{\coth u(kx - \sinh kx)}{1 - u\coth u}\right], \qquad (3)$$

where $$k = \sqrt{\frac{T_0}{E_0 I_0}} = \frac{2}{r_0^2}\sqrt{\frac{T_0}{\pi E_0}} \qquad (4)$$

is the parameter of the tensile force, and $$u = \frac{kl}{2} = \frac{l}{r_0^2}\sqrt{\frac{T_0}{\pi E_0}}. \qquad (5)$$

is the dimensionless parameter of the compressive force.

If the offset, $\Delta$, is small, the force $T_0$ is also small, and so are the parameters k and u. Then the following approximate formulas can be used:

$$\coth u \cong \frac{1}{u} - \frac{u}{3},\ \sinh kx \cong kx + \frac{(kx)^3}{6},\ \cosh kx \cong 1 + \frac{(kx)^2}{2}. \qquad (6)$$

Then the solution (3) yields:

$$w(x) = w_0(x) = \Delta\left(3\frac{x^2}{l^2} - 2\frac{x^3}{l^3}\right). \qquad (7)$$

This formula describes the deflection curve of an interconnect, when the offset is small, or when the reactive force does not occur.

1.2 Rotating Angles

From the (3)

$$w'(x) = -\frac{\Delta}{l}u\sinh kx + \frac{\coth u(1 - \cosh kx)}{1 - u\coth u} \qquad (8)$$

$$= \frac{\Delta}{l}u\cosh u - \frac{\cosh(kx - u)}{u\cosh u - \sinh u}$$

$$= w'\left(\frac{l}{2}\right)\cosh u - \frac{\cosh(kx-u)}{\cosh u - 1},$$

where $$w'\left(\frac{l}{2}\right) = \frac{\Delta}{l}\left[u\cosh u - \frac{1}{u\cosh u - \sinh u}\right] = \frac{3\Delta}{2l}\phi_0(u) \qquad (9)$$

is the angle of rotation at the mid-cross-section of the fiber, and the function $$\phi_0(u) = \frac{2}{3}u\cosh u - \frac{1}{u\cosh u - \sinh u},\ \frac{2}{3} \le \phi_0 \le 1, \qquad (10)$$

considers the effect of the tensile force on the angle of rotation at the mid-cross-section. This function changes from $\phi_0=1$ to $\phi_0=2/3=0.667$, when the tensile force, $T_0$, changes from zero to infinity. The calculated values of the function $\phi(u)$ are shown in Table 1 and plotted in FIG. 2.

Table 1. Auxiliary Functions to Calculate Deflections, Rotation Angles and Curvatures

Figure 2:
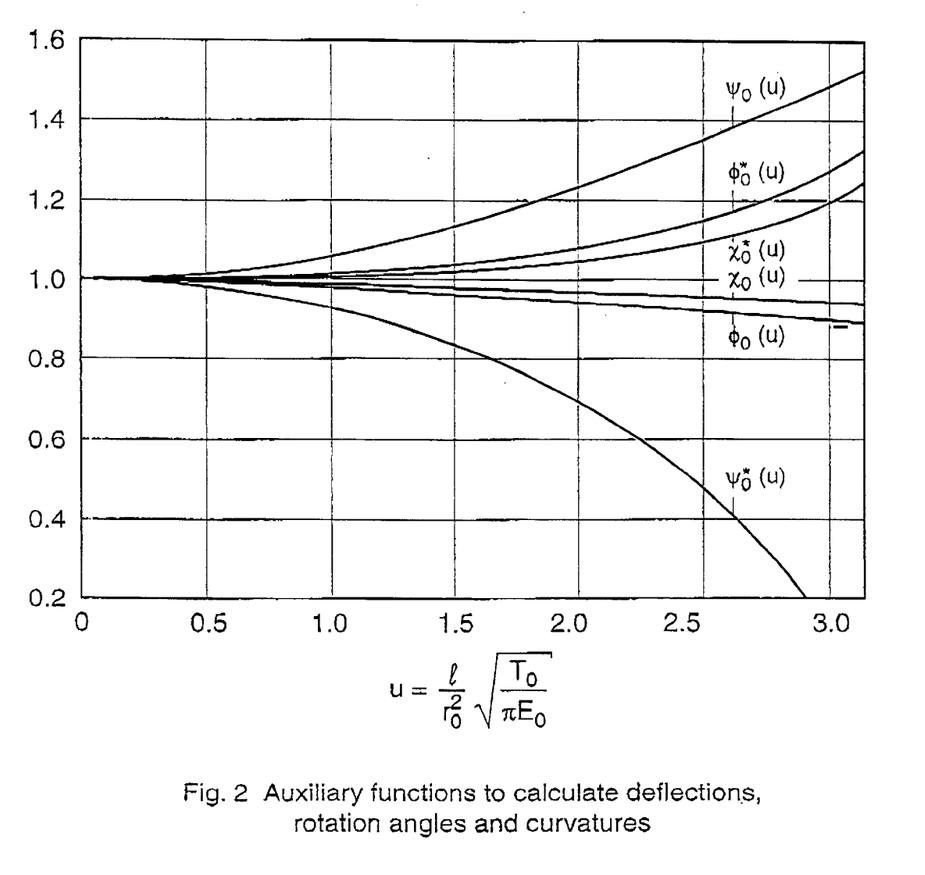
FIG. 2. depicts auxiliary functions to calculate deflections, rotational angles and curvatures.

| u | 0 | π/6 | π/3 | π/2 | 2π/3 | 5π/6 | π |
|---|---|---|---|---|---|---|---|
| $\Phi_0(u)$ | 1.000 | 0.995 | 0.983 | 0.964 | 0.941 | 0.916 | 0.892 |
| $\chi_0(u)$ | 1.000 | 0.997 | 0.990 | 0.980 | 0.968 | 0.955 | 0.944 |
| $\psi_0(u)$ | 1.000 | 1.018 | 1.071 | 1.154 | 1.262 | 1.388 | 1.528 |
| $\Phi_0^*(u)$ | 1.000 | 1.005 | 1.019 | 1.047 | 1.095 | 1.177 | 1.333 |
| $\chi_0^*(u)$ | 1.000 | 1.003 | 1.011 | 1.028 | 1.059 | 1.117 | 1.250 |
| $\psi_0^*(u)$ | 1.000 | 0.982 | 0.924 | 0.822 | 0.662 | 0.413 | 0 |

1.3 Tensile Strain and Stress

The length of the deflected and stretched fiber can be found as $$s = \int_0^l \sqrt{1 + [w'(x)]^2}\,dx \cong l + \frac{1}{2}\int_0^l [w'(x)]^2\,dx \qquad (11)$$

The corresponding tensile strain, $\epsilon_0$, can be determined, using (8), as follows:

$$\epsilon_0 = \frac{s-l}{l} = \frac{1}{2l}\int_0^l [w'(x)]^2\,dx = \frac{3}{5}\frac{\Delta^2}{l^2}\chi_0(u), \qquad (12)$$

where the function $$\chi_0(u) = \frac{5}{6}u^2\frac{1 + \frac{1}{2}\cosh 2u - \frac{3}{2}\frac{\sinh 2u}{2u}}{(\sinh u - u\cosh u)^2},\ \chi_0 \ge 1, \qquad (13)$$

changes from "one" to infinity, when the tensile force, $T_0$, changes from zero to infinity. This function is tabulated in Table 1 and plotted in FIG. 2.

The tensile stress is $$\sigma_t = \frac{T_0}{\pi r_0^2} = E_0\frac{r_0^2}{l^2}u^2. \qquad (14)$$

This stress can be brought down to zero, if the interconnect supports are moved closer by the distance $$\delta_0 = \epsilon_0 l = \frac{3}{5}\frac{\Delta^2}{l}\chi_0(u) \qquad (15)$$

to compensate for the reactive tensile strain. If this is done, the deflection curve will be expressed by the formula (7).

1.4 Bending and Total Stress

The bending stress can be evaluated from the formula (8) as follows:

$$\sigma_b(x) = E_0 r_0 w''(x) = \sigma_b(0) \frac{\sinh(u - kx)}{\sinh u}, \quad (16)$$

where $$\sigma_b(0) = -\sigma_b(l) = 6E_0 \frac{\Delta r_0}{l^2} \psi_0(u) \quad (17)$$

is the maximum bending stress that occurs at the end cross-sections, and the function $$\psi_0(u) = \frac{u^2}{3} \frac{1}{u \coth u - 1}, \quad \psi_0 \geq 1 \quad (18)$$

considers the effect of the tensile force on the maximum bending stress. This function changes from "one" to infinity, when the tensile force changes from zero to infinity. The function $\psi_0(u)$ is tabulated in Table 1 and plotted in FIG. 2.

The total tensile stress in the fiber is due to both tension and bending and is as follows:

$$\sigma_{tot.} = \frac{T_0}{\pi r_0^2} + \sigma_b(0) = E_0 \frac{r_0^2}{l^2} u^2 + 6E_0 \frac{\Delta r_0}{l^2} \psi_0(u). \quad (19)$$

1.5 Effect of the "Active" Tension

The effect of the additional "active" tension, if any, can be evaluated if a new tensile force, which is expressed as $$T_1 = \pi E_0 r_0^2 \frac{\delta_0 + \delta_1}{l}, \quad (20)$$

is introduced, so that the new parameters of the tensile force are $$k_1 = \sqrt{\frac{T_1}{E_0 I_0}} = \frac{2}{r_0^2} \sqrt{\frac{T_1}{\pi E_0}}, \quad u_1 = \frac{k_1 l}{2} = \frac{l}{r_0^2} \sqrt{\frac{T_1}{\pi E_0}}. \quad (21)$$

In the formula (20), $\delta_1$ is the additional, thermally induced, displacement due to the "active" (external) force.

2. Optical Fiber Interconnect Subjected to the Ends Offset and Axial Compression

2.1 Deflection Function

In the case of axial compression, the "minus" sign in front of the second term in the equation (1) should be replaced with the "plus" sign. In this case the equation of bending has the following solution:

$$w(x) = \frac{\Delta}{2} \frac{1 - \cos kx - \cot u (kx - \sin kx)}{1 - u \cot u}, \quad (22)$$

Figure 3:
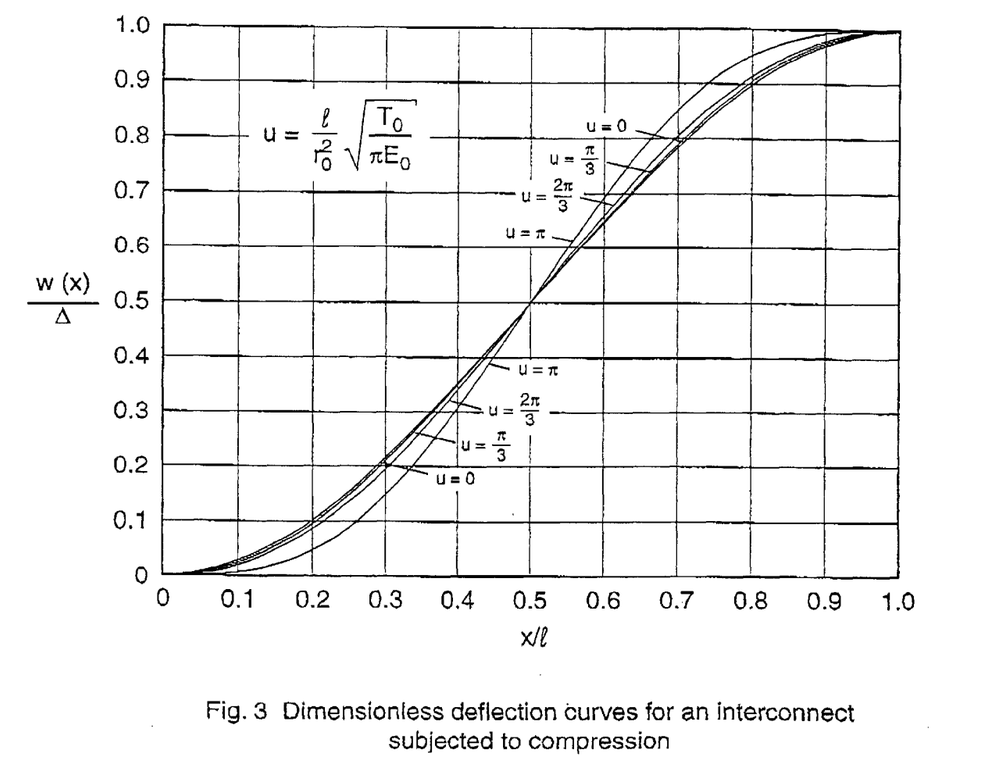
FIG. 3. depicts dimensionless deflection curves for an interconnect subjected to compression.

The deflection function $w(x)$ is plotted in FIG. 3 for different u values. $u = \pi$ is the condition preceding buckling From (22) we find:

$$\begin{aligned} w(x) &= \frac{\Delta}{2}\left(1 - \cos\frac{\pi x}{l}\right), \text{ for } u = \frac{\pi}{2}, \\ w(x) &= \frac{\Delta}{2} \frac{1 - \cos\frac{4\pi x}{3l} - \frac{1}{\sqrt{3}}\left(\frac{4\pi x}{3l} - \sin\frac{4\pi x}{3l}\right)}{1 - \frac{2\pi}{3\sqrt{3}}}, \text{ for } u = \frac{2\pi}{3}. \\ w(x) &= \frac{\Delta}{2\pi}\left(\frac{2\pi x}{l} - \sin\frac{2\pi x}{l}\right), \text{ for } u = \pi \end{aligned} \quad (23)$$

When the force, $T_0$, is small, the following approximate formulas can be used:

$$\cot u = \frac{1}{u} - \frac{u}{3}, \sin kx \cong kx - \frac{(kx)^3}{6}, \cos kx \cong 1 - \frac{(kx)^2}{2}, \quad (24)$$

and the expression (22) results in the formula (9).

2.2 Rotation Angles

The angles of rotation of the fiber cross-sections can be obtained from (22) by differentiation:

$$w'(x) = \frac{\Delta}{l} u \frac{\cos(kx - u) - \cos u}{\sin u - u \cos u} = w'\left(\frac{l}{2}\right) \frac{\cos(kx - u) - \cos u}{1 - \cos u}, \quad (25)$$

where $$w'\left(\frac{l}{2}\right) = \frac{\Delta}{l} u \frac{1 - \cos u}{\sin u - u \cos u} = \frac{3\Delta}{2l} \phi_0^*(u) \quad (26)$$

is the angle of rotation at the mid-cross-section, and the function $$\phi_0^*(u) = \frac{2}{3} u \frac{1 - \cos u}{\sin u - u \cos u} \quad (27)$$

consider the effect of the compressive force on the angle of rotation at the mid-cross-section. The function $\phi_0^*(u)$ is tabulated in Table 1 and plotted in FIG. 2.

The formulas (26) and (27) yield:

$$\begin{aligned} w'\left(\frac{l}{2}\right) &= \frac{\pi}{2} \frac{\Delta}{l} = 1.5708 \frac{\Delta}{l}, \text{ for } u = \frac{\pi}{2} \\ w'\left(\frac{l}{2}\right) &= \frac{6\pi}{3\sqrt{3} + 2\pi} \frac{\Delta}{l} = 1.6420 \frac{\Delta}{l}, \text{ for } u = \frac{2\pi}{3} \\ w'\left(\frac{l}{2}\right) &= \frac{1 + \sqrt{2}}{1 + \frac{4}{3\pi}} \frac{\Delta}{l} = 1.6948 \frac{\Delta}{l}, \text{ for } u = \frac{3\pi}{4} \\ w'\left(\frac{l}{2}\right) &= 2 \frac{\Delta}{l}, \text{ for } u = \pi \end{aligned} \quad (28)$$

2.3 Compressive Strain

The length, s, of the compressed interconnect (assuming zero initial compression) is $$s = \int_0^l \sqrt{1 - [w'(x)]^2} \, dx \cong l - \frac{1}{2} \int_0^l [w'(x)]^2 \, dx = l - \frac{3}{5} \frac{\Delta^2}{l^2} \chi_0^*(u), \quad (29)$$

where the function $$\chi_0^*(u) = \frac{5}{6}u^2 \frac{1+\frac{1}{2}\cos 2u - \frac{3}{2}\frac{\sin 2u}{2u}}{(\sin u - u\cos u)^2}, \chi_0^* \geq 1, \quad (30)$$

considers the effect of the compressive force. This function is tabulated in Table 1 and plotted in FIG. 2. The compressive strain is $$\varepsilon_0 = \frac{l-s}{l} = \frac{3}{5}\frac{\Delta^2}{l^2}\chi_0^*(u). \quad (31)$$

The formulas (30) and (31) yield:

$$\begin{aligned}
\varepsilon_0 &= \frac{3}{5}\frac{\Delta^2}{l^2} = 0.6\frac{\Delta^2}{l^2}, \text{ for } u = 0 \\
\varepsilon_0 &= \left(\frac{\pi}{4}\right)^2 \frac{\Delta^2}{l^2} = 0.6169\frac{\Delta^2}{l^2}, \text{ for } u = \frac{\pi}{2} \\
\varepsilon_0 &= 2\left(\frac{\pi}{3}\right)^2 \frac{1+\frac{3\sqrt{3}}{4\pi}}{\left(1+\frac{2\pi}{3\sqrt{3}}\right)^2}\frac{\Delta^2}{l^2} = 0.6352\frac{\Delta^2}{l^2}, \text{ for } u = \frac{2\pi}{3} \\
\varepsilon_0 &= \frac{1+\frac{1}{\pi}}{\left(1+\frac{4}{3\pi}\right)^2}\frac{\Delta^2}{l^2} = 0.6498\frac{\Delta^2}{l^2}, \text{ for } u = \frac{3\pi}{4} \\
\varepsilon_0 &= \frac{3}{4}\frac{\Delta^2}{l^2} = 0.75\frac{\Delta^2}{l^2}, \text{ for } u = \pi
\end{aligned} \quad (32)$$

2.4 Bending Stress

Figure 4:
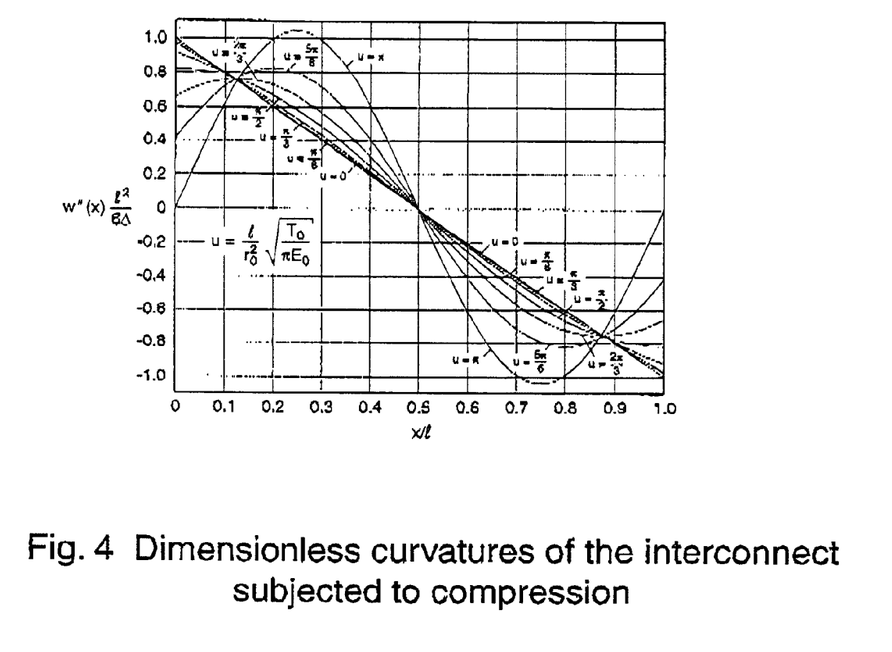
FIG. 4. depicts dimensionless curvatures for an interconnect subjected to compression.

Using the expression (25) for the rotation angles, we obtain the following formula for the bending stress:

$$\sigma_b(x) = E_0 r_0 w''(x) = \sigma_b(0)\frac{\sin(u-kx)}{\sin u}, \quad (33)$$

where $$\sigma_b(0) = -\sigma_b(l) = 6E_0 \frac{\Delta r_0}{l^2}\psi_0^*(u) \quad (34)$$

is the bending stress at the end cross-sections, and the function $$\psi_0^*(u) = \frac{u^2}{3}\frac{1}{1-u\cot u}, \psi_0^* \leq 1 \quad (35)$$

considers the effect of the compressive force. This function is tabulated in Table 1 and plotted in FIG. 2. The curvature w''(x) is plotted, for different u values, in FIG. 4. The formulas (34) and (35) yield:

$$\begin{aligned}
\sigma_b(0) &= 6E_0\frac{\Delta r_0}{l^2}, \text{ for } u = 0 \\
\sigma_b(0) &= \frac{\pi^2}{2}E_0\frac{\Delta r_0}{l^2} = 4.9348 \frac{\Delta r_0}{l^2}, \text{ for } u = \frac{\pi}{2} \\
\sigma_b(0) &= 2\frac{\left(\frac{2\pi}{3}\right)^2}{1+\frac{2\pi}{3\sqrt{3}}}E_0\frac{\Delta r_0}{l^2} = 3.9711E_0\frac{\Delta r_0}{l^2}, \text{ for } u = \frac{2\pi}{3} \\
\sigma_b(0) &= 2\frac{\left(\frac{3\pi}{4}\right)^2}{1+\frac{2\pi}{4}}E_0\frac{\Delta r_0}{l^2} = 3.3083E_0\frac{\Delta r_0}{l^2}, \text{ for } u = \frac{3\pi}{3} \\
\sigma_b(0) &= 0, \text{ for } u = \pi
\end{aligned} \quad (36)$$

and $$\begin{aligned}
\sigma_b\left(\frac{l}{4}\right) &= \sigma_b(0)\frac{\sin\frac{u}{2}}{\sin u} = \frac{\sigma_b(0)}{2\cos\frac{u}{b}} = 3E_0\frac{\Delta r_0}{l^2}, \text{ for } u = 0 \\
\sigma_b\left(\frac{l}{4}\right) &= \frac{\pi^2}{2\sqrt{2}}E_0\frac{\Delta r_0}{l^2} = 3.4894E_0\frac{\Delta r_0}{l^2}, \text{ for } u = \frac{\pi}{2} \\
\sigma_b\left(\frac{l}{4}\right) &= \sigma_b(0) = 3.9711E_0\frac{\Delta r_0}{l^2}, \text{ for } u = \frac{2\pi}{3} \\
\sigma_b\left(\frac{l}{4}\right) &= 4.3225E_0\frac{\Delta r_0}{l^2}, \text{ for } u = \frac{3\pi}{4} \\
\sigma_b\left(\frac{l}{4}\right) &= 2\pi E_0\frac{\Delta r_0}{l^2} = 6.2832E_0\frac{\Delta r_0}{l^2}, \text{ for } u = \pi
\end{aligned} \quad (37)$$

Comparing the formulas (36) and (37), it may be concluded that when the compressive force is small, the maximum bending stresses occur at the end cross-sections, and the bending stresses at the points $$x = \frac{l}{4}$$

and $$x = \frac{3l}{4}$$

are only half the value of the bending stress at the interconnect ends. When the compressive force increases, the bending stresses at the end cross-sections decrease, and the bending stresses at the cross-sections $$x = \frac{l}{4}$$

and $$x = \frac{3l}{4}$$

increase. The stresses at the interconnect ends become equal to the stresses at the cross-sections $$x = \frac{l}{4}$$

and $$x = \frac{3l}{4},$$

when the compressive force is such that the parameter u becomes $$u = \frac{2\pi}{3} = 2.0944.$$

Accordingly, compressive forces corresponding to $u=2\pi/3$ or less are favorable. When $u=\pi$ (the condition preceding buckling), the bending stresses at the interconnect ends, $x=0$ and $x=l$, become zero, and the stresses at the cross-sections $$x = \frac{l}{4}$$

and $$x = \frac{3l}{4}$$

are about 4.7% higher than the maximum bending stress at the interconnect ends in the case of zero compression.

$$T_0 = \left(\frac{4\pi}{3}\right)^2 \frac{E_0 I_0}{l^2} = 1.7778 \frac{\pi^2 E_0 I_0}{l^2}, \quad (38)$$

2.5 Total Stress

The total tensile stress in the interconnect subjected to the ends off-set and axial compression can be found as $$\sigma_{tot.}(x) = \sigma_b(x) - \frac{T_0}{\pi r_0^2} = \sigma_b(0)\frac{\sin(u-kx)}{\sin u} - E_0 \frac{r_0^2}{l^2} u^2. \quad (39)$$

This formula yields:

$$\sigma_{tot.}(0) = \sigma_b(0) - E_0 \frac{r_0^2}{l^2} u^2, \quad \sigma_{tot.}\left(\frac{l}{4}\right) = \sigma_b\left(\frac{l}{4}\right) - E_0 \frac{r_0^2}{l^2} u^2, \quad (40)$$

so that $$\left.\begin{aligned}
\sigma_{tot.}(0) &= 6E_0 \frac{\Delta r_0}{l^2}, \text{ for } u = 0 \\
\sigma_{tot.}(0) &= 4.9348 E_0 \frac{\Delta r_0}{l^2} - 2.4674 E_0 \frac{r_0^2}{l^2}, \text{ for } u = \frac{\pi}{2} \\
\sigma_{tot.}(0) &= 3.9711 E_0 \frac{\Delta r_0}{l^2} - 4.3865 E_0 \frac{r_0^2}{l^2}, \text{ for } u = \frac{2\pi}{3} \\
\sigma_{tot.}(0) &= 3.3083 E_0 \frac{\Delta r_0}{l^2} - 5.5517 E_0 \frac{r_0^2}{l^2}, \text{ for } u = \frac{3\pi}{4} \\
\sigma_{tot.}(0) &= -9.8696 E_0 \frac{r_0^2}{l^2}, \text{ for } u = \pi
\end{aligned}\right\} \quad (41)$$

The total tensile stress at the cross-sections $$x = \frac{l}{4}$$

and $$x = \frac{3l}{4}$$

is $$\left.\begin{aligned}
\sigma_{tot.}\left(\frac{l}{4}\right) &= 3E_0 \frac{\Delta r_0}{l^2}, \text{ for } u = 0 \\
\sigma_{tot.}\left(\frac{l}{4}\right) &= 3.4894 E_0 \frac{\Delta r_0}{l^2} - 2.4674 E_0 \frac{r_0^2}{l^2}, \text{ for } u = \frac{\pi}{2} \\
\sigma_{tot.}\left(\frac{l}{4}\right) &= 3.9711 E_0 \frac{\Delta r_0}{l^2} - 4.3865 E_0 \frac{r_0^2}{l^2}, \text{ for } u = \frac{2\pi}{3} \\
\sigma_{tot.}\left(\frac{l}{4}\right) &= 4.3225 E_0 \frac{\Delta r_0}{l^2} - 5.5517 E_0 \frac{r_0^2}{l^2}, \text{ for } u = \frac{3\pi}{4} \\
\sigma_{tot.}\left(\frac{l}{4}\right) &= 6.2832 E_0 \frac{\Delta r_0}{l^2} - 9.8696 E_0 \frac{r_0^2}{l^2}, \text{ for } u = \pi
\end{aligned}\right\} \quad (42)$$

As follows from the expressions (41) and (42), the compressive force that corresponds to $$u = \frac{\pi}{2}$$

results in a compressive stress in the interconnect, if the ratio, $\Delta/r_0$, of the ends offset, $\Delta$, to the fiber radius, $r_0$, is below 0.5. If this ratio is below 1.10, then a compressive force, corresponding to $$u = \frac{2\pi}{3},$$

is required to remove the tensile stress due to bending. In the case of $$\frac{\Delta}{r_0} < 1.28,$$

a force, corresponding to $$u = \frac{3\pi}{4},$$

will be needed. Finally, if the offset-to-radius ratio is below 1.57, a compressive force, corresponding to $u=\pi$, will be necessary to eliminate the tensile stress caused by bending. For larger offset-to-radius ratios, the total stress in the interconnect will remain tensile, even if the compressive force will be close to the critical one. In physical design of the interconnects with ends offset, the favorable effect of compression can be achieved by the proper selection of the material of the interconnect enclosure.

The analytical models predict the maximum tensile stress in an optical fiber interconnect subjected to the ends offset and axial loading in tension or compression. If the ends offset is significant, the reactive tension and the would be subsequent external ("active") tension not only may lead to elevated tensile stresses in the fiber, but, more importantly, can result in a considerable increase in the bending stress. Accordingly, the ends offset and the active tension should be reduced in order to minimize the tensile stresses in the fiber. For compressive loading there is a way to substantially reduce the initial tensile stress, and, if this stress is not very large, even to substantially remove it. This may be done by a proper selection of the coefficient of thermal expansion (contraction) of the material of the enclosure. Based on the analysis, using the developed stress model, this coefficient should be chosen in such a way that the induced compressive force in the fiber is about 44% of the critical values. In this case a 34% relief in the bending stress, compared to the case of zero compression can be achieved. A larger compressive force is not advisable, because of the rapid increase in the fiber curvatures (bending stress) and, as the result of that, in the total maximum tensile stress.

Included in the invention is also a semiconductor device and a method of fabricating a semiconductor device. The semiconductor device has an optical fiber interconnect therein fabricated according to methods described herein.

Embodiments of the invention include cooling and heating over any temperature range, provided an enclosure material having a desired coefficient of expansion is available. An illustrative temperature change is in the range of about 50° C. to about 300° C.

Provided below are examples of applications of analytical models derived herein. All the numerical examples that follow are carried out for a glass fiber interconnect of the radius $r_o=0.0625$ mm, with the coefficient of thermal expansion (CTE) of the material of $\alpha_o=0.5\times10^{-6}$ C.$^{-1}$, and its Young's modulus of $E_o=10.5\times10^6$ psi=7384 kgf/mm$^2$. The elevated soldering or curing temperature, if important, is always assumed to be $t_s=150°$ C.

EXAMPLE 1

Determine the critical (Euler) force and stress for a straight optical fiber interconnect whose length is l=5 mm.

Solution. An optical fiber interconnect, adhesively bonded or soldered at the ends into a capillary or a ferrule can be treated, from the standpoint of structural analysis, as a single-span beam, rigidly clamped at the ends. The critical (Euler, or buckling) force for a beam can be calculated by the formula $$T_e = \frac{4\pi^2 E_0 I_0}{l^2} \tag{1.1}$$

where $$I_0 = \frac{\pi}{4} r_0^4 \tag{1.2}$$

is the moment of inertia of the fiber cross-section. From (1.1) and (1.2) it follows that:

$$T_e = \frac{\pi^3 E_o r_o^4}{l^2} = \frac{\pi^3 \times 7384 \times 0.0625^4}{5^2} = 0.1397 \text{ kgf}$$

The corresponding stress and strain are $$\sigma_e = \frac{T_e}{\pi r_o^2} = \frac{\pi^2 E_o r_o^2}{l^2} = \frac{\pi^2 \times 7384 \times 0.0625^2}{5^2} = 11.3871 \text{ kgf/mm}^2 \tag{1.3}$$

$$\varepsilon_e = \frac{\sigma_e}{E_o} = \left(\frac{\pi r_o}{l}\right)^2 = \left(\frac{\pi \times 0.0625}{5}\right)^2 0.0015421 \tag{1.4}$$

The distance at which the supports should move closer, so the interconnect buckles, is $$\Delta l = \varepsilon_e l = \frac{\pi^2 r_o^2}{l} = 0.0077106 \text{ mm} = 7.7106 \text{ } \mu m \tag{1.5}$$

Note that the buckling force, stress, strain and displacement will not change, if the interconnect experiences ends offsets of a reasonable magnitude.

EXAMPLE 2

Determine the CTE of the enclosure that will result in buckling of the interconnect examined in Example 1.

Solution. The thermally induced stress experienced by the interconnect because of its thermal contraction mismatch with the material of the enclosure can be evaluated as $$\epsilon_0 = \Delta\alpha\Delta t \tag{2.1}$$

where $\Delta t$ is the change in temperature, and $$\Delta\alpha = \alpha_1 - \alpha_0 \tag{2.2}$$

is the difference in the CTE of the enclosure and the silica materials. Buckling will take place if $$\varepsilon_o \geq \varepsilon_e = \left(\frac{\pi r_o}{l}\right)^2 = \left(\frac{\pi \times 0.0625}{5}\right)^2 = 0.001542 \tag{2.3}$$

so that the critical value of the CTE of the enclosure is $$\alpha_1^e = \alpha_o + \frac{1}{\Delta t}\left(\frac{\pi r_o}{l}\right)^2 \tag{2.4}$$

If the operating temperature is the room temperature (~25° C.), then $\Delta t=125°$ C., and the formula (2.4) yields:

$$\alpha_1^e = 0.5\times10^{-6} + \frac{1}{125}\left(\frac{\pi \times 0.0625}{5}\right)^2 = 12.837\times10^{-6}° C.^{-1} \tag{2.5}$$

If the operating temperature is, for example, 5° C., then $\alpha_1^e=11.1353\times10^{-6}°C.^{-1}$. Hence, if one does not want the interconnect to buckle, the CTE of the enclosure should not exceed $\alpha_1^e=12.837\times10^{-6}$ C.$^{-1}$, if the operating temperature is 25° C., and $\alpha_1^e=11.135\times10^{-6}$ C.$^{-1}$, if the operating temperature is 5° C.

EXAMPLE 3

The condition which results in an elastically stable fiber cannot be met. How high is the tensile stress in the buckled fiber? Assume that the change in temperature is as large as $\Delta t=180°$ C.

Solution. Assume that the elastic curve of the buckled interconnect can be described as $$w(x) = f\left(1 - \cos 2\pi\frac{x}{l}\right) \tag{3.1}$$

This curve satisfies the obvious boundary conditions $$w(0)=0, \; w'(0)=0, \; w(l),=0, \; w'(l)=0 \tag{3.2}$$

The length of the deflected interconnect can be computed as $$s(l) = \int_o^l \sqrt{1+[w'(x)]^2}\, dx \cong l + \frac{1}{2}\int_o^l [w'(x)]^2\, dx \qquad (3.3)$$
$$= l + \frac{1}{2}\left(\frac{2\pi f}{l}\right)^2 \int_2^l \sin^2 2\pi \frac{x}{l}\, dx = l + \left(\frac{\pi f}{l}\right)^2 \int_o^l \left[1 - \cos 4\pi \frac{x}{l}\right] dx$$
$$= l\left[l + \left(\frac{\pi f}{l}\right)^2\right]$$

The length s(l) should be equal to the initial length, l+δ, of the interconnect (where δ is the distance, at which the ends of the interconnect get closer) minus the distance $\varepsilon_e l$, because of the elastic compression. Thus, the following condition of the compatibility of displacements should be fulfilled:

$$s(l)=l+\delta-\varepsilon_e l \qquad (3.4)$$

From (3.3) and (3.4) we find:

$$f = \frac{1}{\pi}\sqrt{l(\delta - \varepsilon_e l)} = \frac{1}{\pi}\sqrt{l\delta - (\pi r_o)^2} \qquad (3.5)$$

From (3.1) we find that the maximum deflection of the buckled fiber takes place at its mid-cross-section (x=l/2):

$$w_{\max} = w\left(\frac{l}{2}\right) = 2f \qquad (3.6)$$

so that the f value is half the maximum deflection of the buckled interconnect.

The bending stress in the fiber can be computed as follows:

$$\sigma_B(x) = \frac{M(x)}{SM} \qquad (3.7)$$

where $$M(x) = E_o I_o w''(x) = \frac{\pi}{4} E_o r_o w''(x) \qquad (3.8)$$

is the bending moment, and $$SM = \frac{\pi}{4} r_o^3 \qquad (3.9)$$

is the section modulus of the cross-section. Introducing the formulas (3.8) and (3.9) into the formula (3.7) and considering the expression (3.1), provides:

$$\sigma_b(x) = E_o r_o w''(x) = 4\pi^2 \frac{f r_o}{l^2} E_o \cos 2\pi \frac{x}{l} \qquad (3.10)$$

The maximum bending stresses occur at the cross-sections x=0 and x=l at the interconnect ends, and in its mid-cross-section $$x = \frac{l}{2}:$$

$$\sigma_b(0) = \sigma_b\left(\frac{l}{2}\right) = 4\pi^2 \varepsilon_o \frac{f r_o}{l^2} \qquad (3.11)$$

The compressive stress is equal to the buckling (critical) stress, expressed by the formula (1.3):

$$\sigma_c = \sigma_e = E_o\left(\frac{\pi r_o}{l}\right)^2 = 7384\left(\frac{\pi \times 0.0625}{5}\right)^2 = 11.3871 \text{ kgf/mm}^2 \qquad (3.12)$$

Let, for instance, the CTE of the enclosure be $\alpha_1 = 25 \times 10^{-6}$ °C.$^{-1}$, and the operating temperature be 5° C., so that the external strain is $$\Delta\alpha\Delta t = 24.5 \times 10^{-6} \times 145 = 0.0035525 \qquad (3.13)$$

The corresponding axial displacement of the interconnect ends is $$\delta = l\Delta\alpha\Delta t = 5 \times 0.0035525 = 0.0177625 \text{ mm},$$

and the formula (3.5) yields:

$$f = \frac{1}{\pi}\sqrt{5 \times 0.0177625 - (\pi \times 0.0625)^2} = 0.07136 \text{ mm}$$

The formula (3.11) results in the following bending stress:

$$\sigma_b(0) = 4 \times \pi^2 \times 7384 \times \frac{0.07136 \times 0.0625}{5^2} = 52.006 \text{ kgf/mm}^2$$

The compressive stress, as defined by the formula (3.12), is $$\sigma_e = 7384\left(\frac{\pi \times 0.0625}{5}\right)^2 = 11.387 \text{ kgf/mm}^2$$

Hence, the maximum tensile stress in the buckled fiber is $$\sigma_t = \sigma_b(0) - \sigma_c = 52.006 - 11.387 = 40.619 \text{ kgf/mm}^2$$

EXAMPLE 4

The optical fiber interconnect is adhesively bonded or soldered at room temperature and then its clamped ends are subjected to the ends offset. The fiber is l=5 mm long and the offset is Δ=0.128 mm. Determine the bonding, the tensile and the total maximum stress in tension due to the combined action of bending and reactive tension.

Solution. The bending stress in the absence of the reactive tension can be evaluated using the formula (17), in which the function $\Psi_o(u)$ should be put equal to one:

$$\sigma_b = 6E_o\Delta\frac{r_o}{l^2} = 6\times 7384 \times \frac{0.128\times 0.0625}{5^2} = 14.1773 \text{ kgf/mm}^2 \quad (4.1)$$

The tension strain, $\epsilon_o$, can be evaluated on the basis of the formula (12) as $$\varepsilon_o = \frac{3}{5}\frac{\Delta^2}{l^2}\chi_0(u) \quad (4.2)$$

and/or on the basis of the formula (14) as $$\varepsilon_o = \frac{\sigma_t}{E_o} = \left(\frac{r_o u}{l}\right)^2 \quad (4.3)$$

Comparing the formulas (4.2) and (4.3), we conclude that the u value (parameter of the tensile force) can be found from the equation $$\frac{u^2}{\chi_2(u)} = \frac{3}{5}\frac{\Delta^2}{r_0^2} = 2.5166 \quad (4.4)$$

Using the Table 1 data, we find that if the u value is equal to $$u = \frac{\pi}{2} = 1.5708,$$

then $\chi_o(u)=0.980$, and the ratio $u^2/\chi(u)$ is 2.5178, which is in satisfactory agreement with the result (4.4). From the Table 1 we have: $\psi_0(u)=1.154$. The bending stress, with consideration of the effect of tension can be evaluated the formula (17):

$$\sigma_b = 6E_o\frac{\Delta r_o}{l^2}\psi_o(u) = 14.1773\times 1.154 = 16.3606 \text{ kgf/mm}^2 \quad (4.5)$$

The tensile stress can be found from the formula (14):

$$\sigma_t = E_o\left(\frac{r_o u}{l}\right)^2 = 7384\left(\frac{0.0625\times 1.5708}{5}\right)^2 = 2.8468 \text{ kgf/mm}^2 \quad (4.6)$$

Hence, the total tensile stress is $$\sigma_{tot.} = \sigma_b + \sigma_t = 19.2074 \text{ kgf/mm}^2 \quad (4.7)$$

The reactive tension can be relieved if the interconnect supports move close at the distance $$\delta_o = \varepsilon_o l = \quad (4.8)$$

$$\left(\frac{r_o u}{l}\right)^2 l = \left(\frac{0.0625\times 1.5708}{5}\right)^2 5 = 0.0019277 \text{ mm} = 1.9277 \text{ }\mu\text{m}$$

The corresponding strain is $$\epsilon_o = 0.00038554 \quad (4.9)$$

EXAMPLE 5

A $l=5$ mm long initially straight interconnect is bonded at its ends into a capillary at the temperature of 150° C., then cooled to the room temperature of 25° C., and then subjected to the ends offset of $\Delta=0.128$ mm. The CTE of the enclosure in $\alpha_1=10\times 10^{-6\circ}$ C.$^{-1}$. Does the fiber experience tensile stress?

Solution. The compressive strain in the fiber at room temperature, before it becomes subjected to the ends offset, is $$\epsilon_o = \Delta\alpha\Delta t = 9.5\times 10^{-6}\times 125 = 0.0011875 \quad (5.1)$$

The tensile strain, as predicted by the formula (4.9), is $\epsilon_o=0.00038554$, so that the axial compression in the fiber results in the compressive stress of $$\sigma_c = 7384(0.0011875 - 0.00038554) = 5.9217 \text{ kgf/mm}^2$$

The compressive force is $$T_c = \sigma_c \pi r_0^2 = 5.9217\times \pi\times 0.0625^2 = 0.07267 \text{ kgf}$$

The parameter of the axial compressive force is $$u = \frac{l}{r_o^2}\sqrt{\frac{T_c}{\pi E_o}} = \frac{5}{0.0625^2}\sqrt{\frac{0.07267}{\pi\times 7384}} = 2.2655$$

The Table 1 yields: $\chi_o^*(u)=1.078$. Then the bending stress, in accordance with the formula (34), is $$\sigma_b(0) = 6E_o\frac{\Delta r_o}{l^2}\psi_o^*(u) = 14.1773\times 1.078 = 15.2825 \text{ kgf/mm}^2$$

The tensile stress in the fiber is $$\sigma_t = \sigma_b(0) - \sigma_c = 15.2825 - 5.9217 = 9.3608 \text{ kgf/mm}^2$$

EXAMPLE 6

The fiber interconnect examined in the previous examples is subjected first to the offset of $\Delta=0.128$ mm, then the structure is heated up for bonding to the temperature of 150° C. and epoxy material in the capillary is cured at this temperature. Then the fiber is cooled down to room temperature. Select the CTE of the enclosure in such a way that the tensile stress in the fiber is minimized or, if possible, eliminated.

Solution. When the fiber is subjected to the ends offset, it experiences bending stresses only, and the maximum bonding stress is $$\sigma_b = 14.1773 \text{ kgf/mm}^2 \quad (6.1)$$

Since the fiber is allowed to slip in at least one of the supports, no additional stresses occur, when the fiber is heated up to 150° C. However, when it is cooled to room temperature, it experiences compression, and the external compressive strain is $$\epsilon_o = \Delta\alpha\Delta\tau \quad (6.2)$$

The corresponding compressive force is $$T_c = \pi r_0^2 E_0 \Delta\alpha\Delta t \quad (6.3)$$

and the parameter of the compressive force can be computed as $$u = \frac{l}{r_o^2}\sqrt{\frac{T_e}{\pi E_o}} = \frac{l}{r_o}\sqrt{\Delta\alpha\Delta t} \qquad (6.4)$$

The study suggests that the u value be chosen, for the lowest total stress in tension, as $$u = \frac{2\pi}{3}.$$

Then the formula (6.4) yields:

$$\Delta\alpha = \frac{1}{\Delta t}\left(\frac{2\pi}{3l}\right)^2 = \frac{1}{125}\left(\frac{2\times\pi\times 0.0625}{3\times 5}\right)^2 = 5.4831\times 10^{-6}\ C^{-1}.$$

Then the CTE of the enclosure should be $$\Delta\alpha = \frac{1}{\Delta t}\left(\frac{2\pi r_0}{3l}\right)^2 = \frac{1}{125}\left(\frac{2\times\pi\times 0.0625}{3\times 5}\right)^2 = 5.4831\times 10^{-6}\ C^{-1}.$$

This coefficient of thermal expansion is or near that of Kovar™. Thus, a Kovar™ enclosure will minimize tensile stress in the fiber when the structure is cooled from 150° C. to room temperature. The total tensile stress, predicted by the third formula in (42) is $$\sigma_{tot.} = 3.9711 E_0 \frac{\Delta r_0}{l^2} - 4.3865 E_o \frac{r_o}{l^2}$$

$$= 3.9711\times 7384\times\frac{0.0625\times 0.128}{5^2} - 4.3865\times 7384\times\frac{0.0625^2}{5^2}$$

$$= 4.3223\ kgf/mm^2$$

This stress is significantly lower than the "initial" bending stress of 14.1773 kgf/mm$^2$.

While the invention has been described by illustrative embodiments, additional advantages and modifications will occur to those skilled in the art. Therefore, the invention in its broader aspects is not limited to specific details shown and described herein. Modifications, for example, to structure dimensions, materials and uses, and to calculations of desirable coefficients of thermal expansion, may be made without departing from the spirit and scope of the invention. Accordingly, it is intended that the invention not be limited to the specific illustrative embodiments but be interpreted within the full spirit and scope of the appended claims.

What is claimed is:

1. A method of fabricating a structure comprising an optical fiber interconnect rigidly clamped within an enclosure wherein ends of the interconnect are offset, the method comprising:
   selecting an enclosure material such that its coefficient of thermal expansion leads, during cooling, to a compressive force on the interconnect that minimizes tensile stress in the interconnect.

2. The method of claim 1 wherein the structure is cooled from a manufacturing temperature to room temperature.

3. The method of claim 1 wherein the structure is cooled by an amount in the range of about 50° C. to about 300° C.

4. The method of claim 1 wherein the compressive force corresponds to a compressive force parameter, u, less than or equal to about $2\pi/3$.

5. The method of claim 1 wherein the compressive force is such that stresses at the ends of the interconnect are substantially equal to stresses at fiber cross-sections at distances, x=l/4 and x=3l/4 from the interconnect ends wherein l is the interconnect span.

6. The method of claim 1 wherein the compressive force is less than or equal to about 44% of the critical force.

7. The method of claim 6 wherein the compressive force is in the range of about 35% to about 44% of the critical force.

8. A structure comprising an optical fiber interconnect rigidly clamped within an enclosure, the optical fiber interconnect having ends offset, wherein the enclosure material has a coefficient of thermal expansion such that a compressive force on the interconnect caused by cooling the structure minimizes the maximum tensile stress in the interconnect.

9. The structure of claim 8 wherein the tensile stress is reduced as the structure is cooled from a manufacturing temperature to room temperature.

10. The structure of claim 8 wherein the compressive force corresponds to a compressive force parameter, u, less than or equal to about $2\pi/3$.

11. The structure of claim 8 wherein the compressive force is such that stresses at the ends of the interconnect are substantially equal to stresses at fiber cross-sections at distances, x=l/4 and x=3l/4 from an interconnect end wherein l is the interconnect span.

12. The structure of claim 8 wherein the compressive force is less than or equal to about 44% of the critical force.

13. The structure of claim 12, wherein the compressive force is in the range of about 35% to about 44% of the critical force.

14. A semiconductor device having an optical fiber interconnect therein, wherein the optical fiber interconnect is fabricated according to the method in claim 1.

15. A method of fabricating a semiconductor device having an optical fiber interconnect therein, wherein the optical fiber interconnect is fabricated according to claim 1.

16. A structure comprising an optical fiber interconnect having ends rigidly clamped within an enclosure, the ends of the interconnect being offset, wherein the enclosure material has a coefficient of thermal expansion such that an axial compression of the interconnect caused by cooling the structure minimizes the maximum tensile stress in the interconnect.

17. The structure of claim 16, wherein the axial compression is such that stresses at the ends of the interconnect are substantially equal to stresses at fiber cross-sections at distances x=l/4 and x=3l/4 from an interconnect end wherein l is the interconnect span.

* * * * *